United States Patent
Robinson et al.

(10) Patent No.: US 9,392,219 B2
(45) Date of Patent: Jul. 12, 2016

(54) DISPLAY-CAMERA SYSTEM (71) Applicant: Hewlett-Packard Development Company, L.P., Houston, TX (US)

(72) Inventors: Ian N. Robinson, Pebble Beach, CA (US); Kar-Han Tan, Sunnyvale, CA (US); Marco Fiorentino, Mountain View, CA (US); David A. Fattal, Mountain View, CA (US)

(73) Assignee: Howlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 13/956,077

(22) Filed: Jul. 31, 2013

(65) Prior Publication Data
US 2015/0035936 A1 Feb. 5, 2015

(51) Int. Cl.
| | |
|---|---|
| H04N 7/14 | (2006.01) |
| G02F 1/335 | (2006.01) |
| H04N 5/225 | (2006.01) |
| G09G 3/34 | (2006.01) |
| G02F 1/1335 | (2006.01) |

(52) U.S. Cl.
CPC ............ *H04N 7/144* (2013.01); *G09G 3/3406* (2013.01); *H04N 5/2254* (2013.01); *G02F 1/133615* (2013.01)

(58) Field of Classification Search
CPC .............. H04N 7/144; G02F 1/133615; G02F 1/13362; G02B 6/0011; G02B 6/0013; G02B 13/001; G02B 13/0055; G02B 21/361; G06F 1/1605; G06F 1/1686
USPC ............................................. 349/65; 345/207
See application file for complete search history.

(56) References Cited

U.S. PATENT DOCUMENTS

| | | |
|---|---|---|
| 5,025,314 A | 6/1991 | Tang et al. |
| 5,117,285 A | 5/1992 | Nelson et al. |
| 5,282,027 A | 1/1994 | Tanigaki et al. |
| 5,400,069 A | 3/1995 | Braun et al. |
| 5,422,683 A | 6/1995 | Tanigaki |
| 5,784,138 A | 7/1998 | Kollarits et al. |
| 6,773,126 B1 | 8/2004 | Hatjasalo et al. |
| 7,085,056 B2 | 8/2006 | Chen et al. |

(Continued)

FOREIGN PATENT DOCUMENTS

WO  WO-2012004016  1/2012

OTHER PUBLICATIONS

Choi et al., "Design and Analysis of Diffractive Grating Imprinted Light-guide Plate for LCD Illumination," J. Information Display, V. 5, N. 1, 2004, pp. 7-15.

Dodgson, N.A. et al., "Multi-View Autostereoscopic 3D Display", (Research Paper) 1999, University of Cambrige Computer Laboratory, UK.

(Continued)

Primary Examiner — William C Dowling
Assistant Examiner — Ryan Howard
(74) Attorney, Agent, or Firm — Mannava & Kang P.C.

(57) ABSTRACT

According to an example, a display-camera system includes a transparent display panel and a transparent backlight panel. Light sources emit light into the edge of the transparent backlight panel. A first polarizer, between the light sources and the edge of the transparent backlight panel, polarizes the light emitted from the light sources and the transparent backlight panel directs the polarized light towards the transparent display panel. A camera, adjacent a back surface of the transparent backlight panel captures an image of a scene through the transparent display panel and the transparent backlight panel.

13 Claims, 5 Drawing Sheets

(56) References Cited

U.S. PATENT DOCUMENTS

| | | |
|---|---|---|
| 7,253,799 B2 | 8/2007 | Lee et al. |
| 7,527,416 B2 | 5/2009 | Lin |
| 7,690,795 B2 | 4/2010 | Cole et al. |
| 8,035,624 B2 | 10/2011 | Bell et al. |
| 8,130,341 B2 | 3/2012 | Papakonstantinou et al. |
| 8,345,129 B2 | 1/2013 | Kanade et al. |
| 8,384,760 B2 | 2/2013 | Tan |
| 2004/0207995 A1 | 10/2004 | Park et al. |
| 2006/0187677 A1 | 8/2006 | Parikka et al. |
| 2006/0285185 A1 | 12/2006 | Choi et al. |
| 2007/0120879 A1* | 5/2007 | Kanade .............. H04N 7/144 346/107.2 |
| 2008/0231773 A1* | 9/2008 | Daiku .............. G02B 6/0056 349/65 |
| 2009/0102763 A1 | 4/2009 | Border et al. |
| 2009/0141116 A1 | 6/2009 | Kanade et al. |
| 2010/0073456 A1 | 3/2010 | Bolle |
| 2010/0188548 A1 | 7/2010 | Robinson et al. |
| 2010/0207964 A1 | 8/2010 | Kimmel et al. |
| 2011/0134205 A1 | 6/2011 | Arney et al. |
| 2011/0170184 A1 | 7/2011 | Wolk |
| 2011/0188106 A1 | 8/2011 | Bae et al. |
| 2011/0227876 A1 | 9/2011 | Ilmonen |
| 2012/0127751 A1 | 5/2012 | Kimmel |
| 2012/0147296 A1 | 6/2012 | Montgomery et al. |

OTHER PUBLICATIONS

Heikenfeld et al., "Electrowetting Light Valves with Greater than 80% Transmission, Unlimited View Angle, and Video Response," Soc. Instr. Displays Digest 36, 2005, pp. 1674-1677.

Kimmel et al., "A Novel Diffractive Backlight Concept for Mobile Displays," SID 07 Digest, 38(1), 2007, pp. 42-45.

Kimmel et al., "Diffractive Backlight Light Guide Plates in Mobile Electrowetting Display Applications," SID Symposium Digest of Technical Papers, 47(2), 2009, pp. 826-829.

Kimmel et al., "Mobile display backlight light guide plates based on slanted grating arrays," J. Photonics for Energy, V. 2, 2012, pp. 024501-1-024501-11.

Miyamoto et al.,"Novel diffraction grating light guide for LED backlight," Proc. of SPIE, V. 6488, 2007, pp. 64880H-1-64880H-8.

Selviah et al., "Modeling of a Color-Separating Backlight with Internal Mirrors," SID Symposium Digest, vol. XXXV, Book I, 2004, pp. 487-489.

Van Berkel, C. et al., "Characterisation and Optimisation of 3D-LCD Module Design", Proc SPIE, 1997, vol. 3012, pp. 179-187.

Wilson, Andrew D., "TouchLight: An Imaging Touch Screen and Display for Gesture-Based Interaction", Microsoft Research; pp. 69-76, Oct. 13-15, 2004. < http://dl.acm.org/citation.cfm?id=1027946&dl=ACM&coll=DL&CFID=180040894&CFTOKEN=81791487 >.

* cited by examiner

DISPLAY-CAMERA SYSTEM

BACKGROUND

Some systems including a display and a camera allow users who are in different locations to see and talk to one another, creating the illusion that the participants are in the same room. For example, it is not uncommon to have a webcam attached to a computer for video conferencing over the Internet. Generally, these systems perform the reception and transmission of audio-video signals so that the remotely located participants are able to communicate in real-time or without noticeable delay. Some remote collaboration and telepresence systems also include on-screen drawing capabilities and content sharing capabilities. The visual aspect of remote collaboration and telepresence systems enhances remote communications by allowing the users to perceive one another as well as any shared content.

BRIEF DESCRIPTION OF DRAWINGS

The embodiments are described in detail in the following description with reference to examples shown in the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

A display-camera system, according to an example, can display an image on a see-through screen and capture images of a scene through the screen. A visible light camera is positioned behind the screen, which enables a user to look at an image displayed on the screen while the camera captures an image of the user through the screen. In one example, the images displayed on the screen may be images of a remote user and the images captured by the camera are images of a local user interacting with the remote user in a video conference. In another example, the content shown on the see-through screen may be a product display or a display of any type of content, and the camera may capture a user's interaction with the display through the see-through screen. The camera can capture any scene in front of the see-through screen.

According to an example, the see-through screen is a liquid crystal display (LCD), and the system includes a transparent backlight that is edge-illuminated by a light source. The backlight directs the light emitted by the light source through the LCD to the viewer. The camera is situated behind the backlight, and captures images through the LCD and the backlight. A first polarizer is placed at the edge of the backlight between the light source and the backlight. A second polarizer may be placed at the front side of the LCD. The backlight may be polarization preserving so the function of the LCD is maintained. Also, by placing the first polarizer at the edge of the LCD, light captured by the camera does not pass through the first polarizer, which may improve the transmittance of light from the front of LCD to the camera and also improve the quality of the image captured by the camera.

The backlight may include a diffuser to diffuse light from the light source and provide even lighting for a liquid crystal (LC) panel in the LCD. A notch filter may be provided at the camera to remove any light from the light source that is scattered backwards from the backlight. This allows the camera to capture the remaining spectrum of light from the scene in front of the LCD without interference from light emitted by the light source that is reflected towards the camera.

The light source for example includes narrow band light sources, and the notch filter may comprise filters designed to block the light of each of the sources. Examples of the narrow band light sources are lasers and light emitting diodes (LEDs). The lasers or LEDs may be red, green blue (RGB) light sources, whereby each laser or LED emits a frequency band of light (e.g., wavelengths) for one of the colors.

Figure 1:
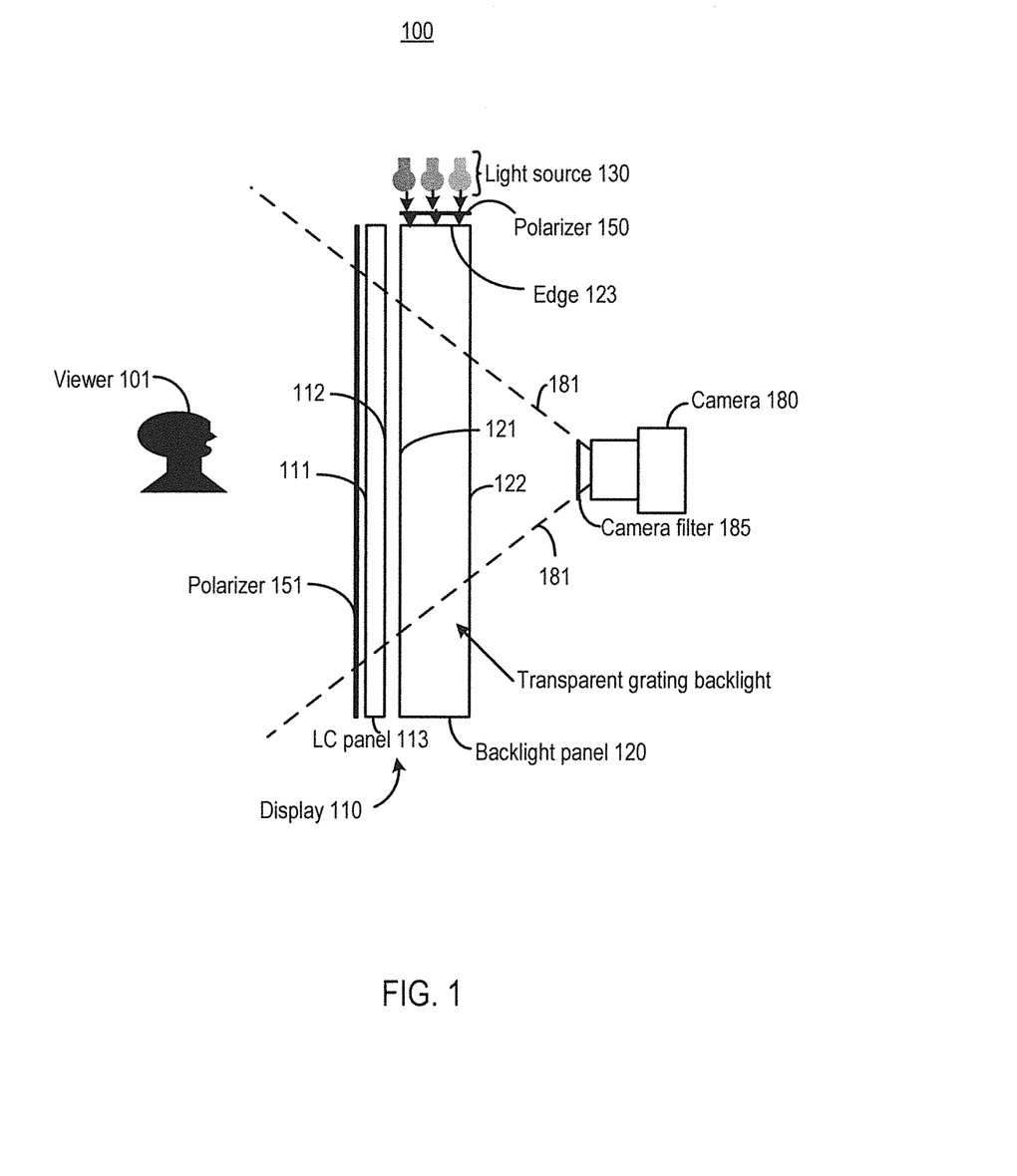
FIG. 1 illustrates an example of a display-camera system.

FIG. 1 illustrates an example of a display-camera system 100. The system 100 includes a display 110 to display content to a viewer 101 and a back surface 112. The display 110 may include a passive display illuminated by a backlight panel 120. In one example, the display 110 includes an LC panel 113 but other types of passive display panels may be used. A panel includes a structure having a depth. The panel may include a rectangular shape also having a length and width as well as a depth but the panel shape may be other than rectangular. Panels may be combined to form the display 110. A display panel is a structure that includes a mechanism to display content, such as liquid crystals in the LC panel 113, and a backlight panel is a structure to direct light towards the display panel. The backlight panel 120 and the display panel, such as the LC panel 113 may be transparent so a camera behind the display 110 can capture images of the scene in front of the display 110 as is described below. The LC panel 113 includes a front surface 111 to display content and a back surface 112 to receive light from the backlight panel 120. Spaces are shown between the panels and other components of the display 110 to illustrate the different layers of the display 110. However, each of the panels and components of the display 110 may be in contact with each other to form the display 110. For example, a layer for the LC panel 113 may be in contact with a layer for the backlight panel 120 or they may be spaced or separated by in-between layers not shown. Polarizers 150 and 151 may include layers in contact with other layers or components of the display 110.

Light source 130 emits visible light into the backlight panel 120. The light source 130 may include a single light source or multiple light sources. In one example, the light source 130 includes multiple narrowband light sources, such as narrow band RGB light sources. Narrowband, for example, refers to a particular band of frequencies for a specific color. For example, light frequencies defining the color green are for one narrowband of frequencies; light frequencies defining the color red are for another narrowband of frequencies; and light frequencies defining the color blue are for another narrowband of frequencies. Each light source may emit a narrowband of light for a particular color. Filters matching each narrowband of light may be used to block light for particular colors as is described below.

The backlight panel 120 is a transparent backlight having a front surface 121 facing the back surface 112 of the LC panel 113, a back surface 122 facing a camera 140, and an edge 123.

The edge 123 is along the depth of the backlight panel 120 rather than along its front surface 121 or its back surface 122. The backlight panel 120 may have more than one edge. For example, the backlight panel 120 may have a rectangular shape with four edges and the light source 130 and polarizer 150 may be along any of the edges. For example, polarizer 150 is at the edge 123 of the backlight panel 120 between the light source 130 and the edge 123 of the backlight panel 120. In one example, the polarizer 150 includes a polarizing film on the edge 123. Polarizer 151 may also include a polarizing film.

The light source 130 emits light, shown with arrows, into the edge 123 of the backlight panel 120, and the light is polarized by the polarizer 150. The polarized light is directed by the backlight panel 120 towards the LC panel 113 to illuminate the LC panel 113. In one example, the backlight panel 120 includes micro-patterned surfaces to direct light towards the LC panel 113. For example, micro-optical structures are created on a surface of the backlight panel 120 to operate as a waveguide to direct the light towards the LC panel 113. The shape, density, and spatial distribution of the micro-optical structures may be selected to achieve high brightness and uniform luminance over the active surface of the LC panel 113. Accordingly, the backlight panel 120, to illuminate the LC panel 113, operates as a waveguide to direct light from the light source 130 towards the LC panel 113. The backlight panel 120 for example directs the light emitted from the light source 130 in a generally orthogonal direction from which the light is received at the backlight panel 120 from the light source 130. Polarizer 151 polarizes the light passing through the LC panel 113. The polarizers 150 and 151 may be crossed polarizers, which have light transmission orientations that are at 90 degrees.

Although not shown, the LC panel 113 may include an LC layer sandwiched between transparent electrode layers. The LC layer includes liquid crystals. Examples of suitable liquid crystals may include substituted phenylcyclohexane liquid crystals, cyano-biphenyl liquid crystals, substituted (1,1'-bicyclohexyl)-4-ylbenzene liquid crystals, substituted tolane liquid crystals, substituted diphenyl-diacetylene liquid crystals, substituted diphenylhexendiyne liquid crystals, and substituted bistolane liquid crystals. A voltage applied to the surrounding electrode layers may alter the alignment of the liquid crystals in sub-layers of the LC layer to control the transmission of light through the panel and vary the content displayed on the display 110. In one example, the liquid crystals are in the twisted configuration, and in this configuration, the liquid crystals are arranged in a helical structure and allow light from the light source 130 and via the backlight panel 120 to pass through. In this configuration, pixels are white and the screen 12 is transparent. In proportion to the voltage that is applied, the liquid crystals untwist. When the crystals straighten out, they change the angle of the light passing through them so that the angle of the light no longer matches the angle/orientation of the polarizer 151. At the areas where the angles do not match, light cannot pass through the display 110 and those areas become darker than the surrounding areas. By properly adjusting the level of the voltage almost any color can be achieved. To show colors, the LC panel 113 includes three RGB subpixels for each color pixel and RGB color filters are used to filter light for a particular subpixel. For example, a non-diffusive transparent color filter array may be included in the display 110 between the polarizer 151 and the LC panel 113 as is further described below with respect to FIGS. 2A-C. In another example, which is also described below with respect to FIG. 3, backlight gratings in the backlight panel 120 direct the RGB light components through the appropriate LC panel subpixels. In this example, the color filter array can be eliminated from the display 110.

A visible light camera 180 captures images of the scene in front of the display 110. For example, the camera 180 captures images of the viewer 101 in front of the display 110. The camera 180 may be a digital charge couple device (CCD) or complementary metal-oxide-semiconductor (CMOS) active pixel sensors or another type of commercially available visible light camera. The camera 180 may be a video camera.

The camera 180 may be adjacent but spaced from the back surface 122 of the backlight panel 120. The spaced distance may be selected so that a field of view (FOV) of the camera 180 encompasses all or a fraction of an area of the back surface 112 the LC panel 113. As such, the depth at which the camera 180 is positioned with respect to the back surface 122 of the backlight panel 120 depends, at least in part, on the FOV of the camera 180 that is used. In the example shown in FIG. 1, the FOV of the camera 180 is represented by dashed lines 181 and encompasses most of the back surface 112 the LC panel 113 but not all of the back surface 112.

A camera filter 185 may be used to filter light generated by the light source 130. For example, the camera filter 185 may be a notch filter to remove any light from the light source that is scattered backwards from the backlight. This allows the camera 180 to capture the remaining spectrum of light from the scene in front of the display 110 without interference from light emitted by the light source 130 that is reflected towards the camera. In one example, the camera filter 185 can be eliminated. For example, if the displaying of content on the display 110 and the capturing of images by the camera 180 are multiplexed, the camera filter 185 can be eliminated because the light source 130 is turned off when the camera 180 is capturing an image. The switching between the camera 180 and the display 110 may be provided at a high frequency so it may not be noticed or may be minimally noticed by the viewer 101.

The system 100 may be provided in a single housing including the display 110 and the camera 180 and its other components. Also, the system 100 may be connected to electronics to control the content displayed on the display 110 and to control the camera 180 to capture images.

Figure 2A:
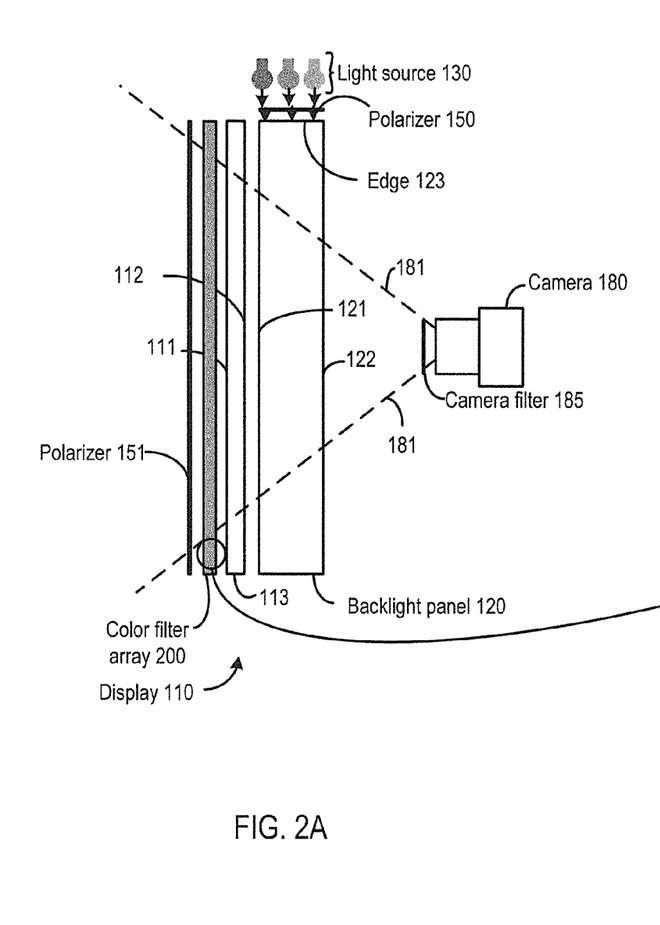
FIGS. 2A-C illustrate other examples of a display-camera system.
Figure 2B:
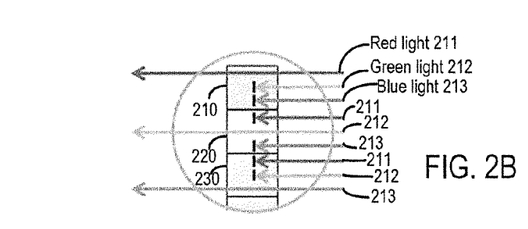
Figure 2C:
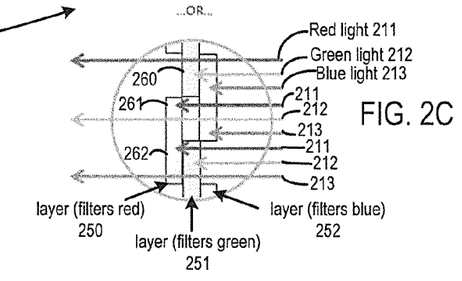

FIG. 2A shows an example of the system 100 including a color filter array 200. The color filter array 200 may be disposed between the LC panel 113 and polarizer 151. The color filter array 200 is designed to be as transparent as possible to the camera 180. For example, the filter array 200 includes filters for each pixel in the LC panel 113 comprised of subpixels for each color, e.g., red, green and blue subpixels. Each filter blocks the other backlight colors that are not for the subpixel, which allows for greater transmittance of light from the scene to the camera 180. For instance, a traditional red filter with a transmittance of approximately 30% or less is replaced with notch filters that block the green and blue light sources, resulting in a much higher transmittance of light to the camera 180. FIGS. 2B and 2C show examples of the notch filters.

FIG. 2B shows one example of the notch filters for a cross section in the color filter array 200 corresponding to a few of the subpixels in the LC panel 113. For example, notch filter 210 is for a red subpixel. The red light 211 from the light source 130, via polarizer 150 and backlight panel 120, is passed but the green light 212 and the blue light 213 is blocked. Notch filter 220 is for a green subpixel and passes the green light 212 and blocks the red light 211 and the blue light 213. Notch filter 230 is for a blue subpixel and passes the blue light 213 and blocks the red light 211 and the green light 212.

In FIG. 2B, the notch filters 210, 220 and 230 may include areas in the color filter array 200 with dual notch properties that are able to pass light for the subpixel and block the other light. In another example shown in FIG. 2C, the notch filters are formed by layering single notch filters and removing filter material in the appropriate locations.

FIG. 2C shows layered notch filters whereby each layer is a filter to block red, green or blue. For example, layer 250 blocks red light, layer 251 blocks green light, and layer 252 blocks blue light. Filter 260 is for a red subpixel, so layers 251 and 252 are removed. Filters 261 and 262 are for a green subpixel and a blue subpixel respectively, and layer 251 is removed for filter 261 and layer 252 is removed for filter 262.

Figure 3:
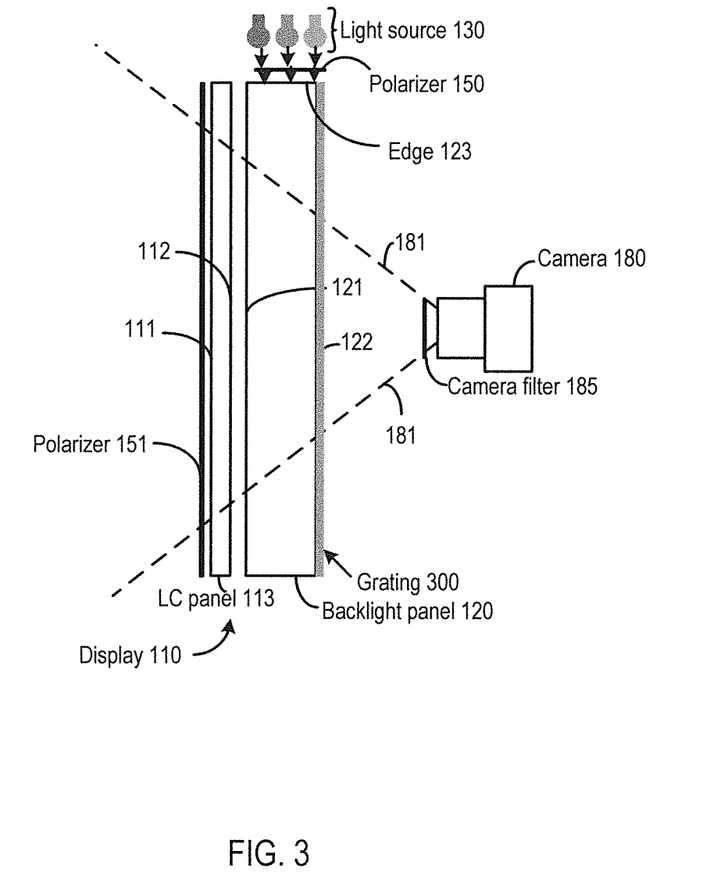
FIG. 3 illustrates another example of a display-camera system.

FIG. 3 shows another example of the system 100 without the color filter array 200 shown in FIGS. 2A-C but instead includes a transparent grating 300 to direct the narrow-band light to respective subpixels. The grating 300 may be on other surfaces of the backlight panel 120 than shown. For example, the grating 300 may be adjacent the LC panel 113, such as on the front surface 121 of the backlight panel 120. The grating 300 may include micro-optical structures (e.g., grooves, ridges, holes, bumps, etc.) formed on a surface of the backlight panel 120. Each grating scatters light of one color in a wide angle, e.g., 60-120 degrees. LC cells in the LC panel 113 associated with the grating modulate received light. In this example no filter is needed, thus increasing the amount of transmitted light. Various characteristics of the grating 300 may be used to control one or both of a directionality of the light from the light source 130 and its wavelength or color selectivity. The directionality may include redirecting the light from the light source 130 towards the LC panel 113. Characteristics of the micro-optical structures include, but are not limited to, grating pitch (feature spacing), grating feature shape, grating feature size (e.g., groove or ridge width), and grating orientation, for example. The grating 300 allows light from the scene in front of the display 110 to be captured by the camera 180.

Figure 4:
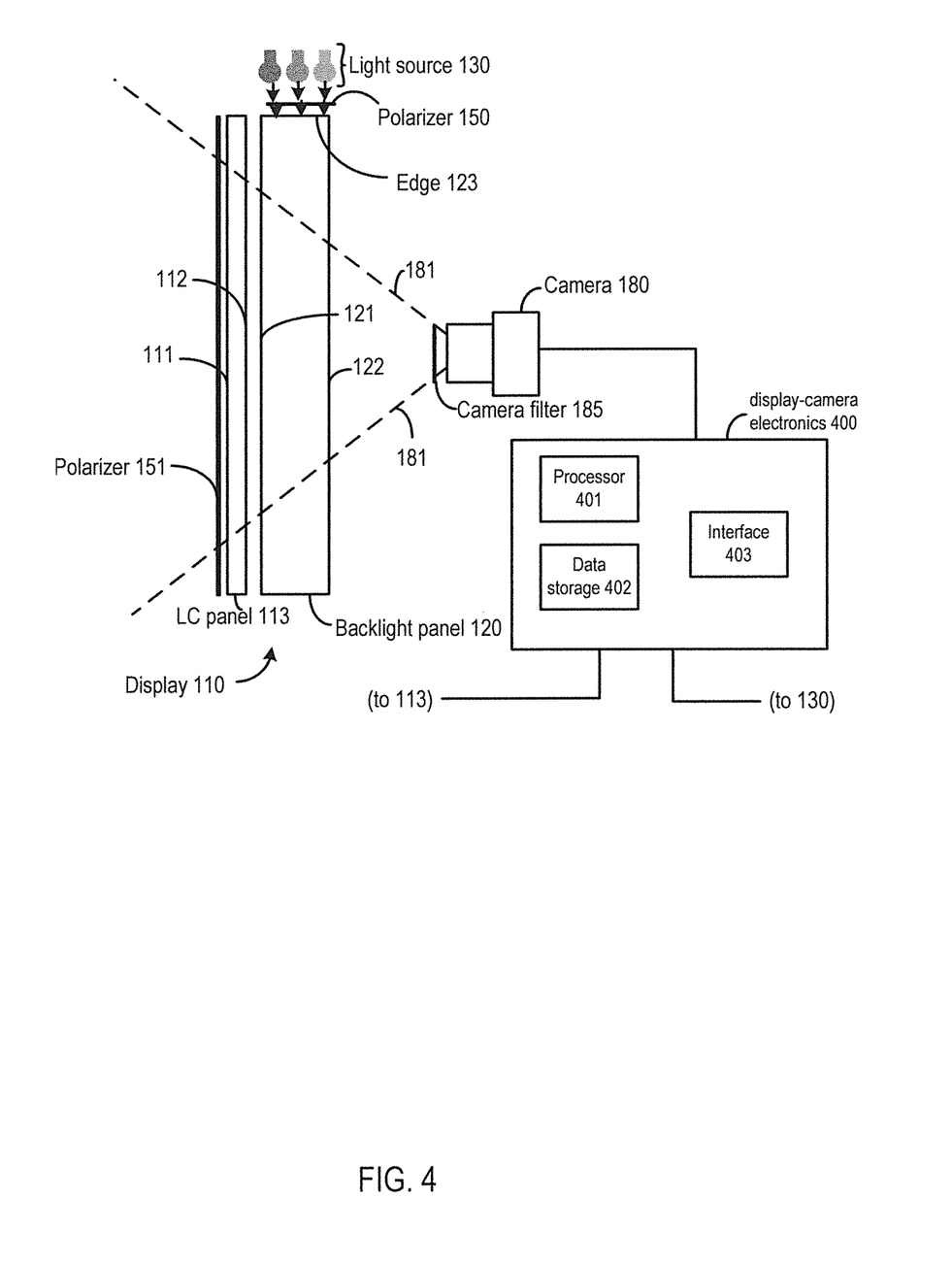
FIG. 4 illustrates an example of electronics for the display-camera system.

FIG. 4 shows an example of display-camera electronics 400 for the system 100. For example, the display-camera electronics 400 may be connected to the display 110, the camera 180 and the light source 130 to control operation of these components. The display-camera electronics 400 may include a processor (or other type of processing circuit) 401 to selectively interact and control the components of the system 100. In one example, the processor 401 is operatively connected to the components of the system 100, such as camera 180, light source 130, LC panel 113, etc., to perform remote interaction or collaboration with another similar system, such as for video teleconferencing.

In one example, the processor 401 performs a time-multiplexing technique to selectively operate the camera 180 and the display 110. The time-multiplexing technique may be performed for any of the examples shown in FIGS. 1-3. Using the time multiplexing technique, when the camera 180 is capturing an image, the processor 401 may cause the LC panel 113 to display a white image, thereby rendering the display 110 fully transparent. The processor 401 may otherwise cause a portion of the LC panel 113 to display a white image, thereby rendering the LC panel 113 spatially-varying transparent. During either of these operations, the processor 401 may cause the light source 130 to be turned off to keep excessive light from reaching the camera 180. In this example, the camera filter 185 may not be included in the system 100 since the light from the light source 130 does not impact the image capture of the camera 180 because the light source 130 is turned off during these times. In the time-multiplexing technique, when the camera 180 is not capturing an image, the processor 401 may cause the LC panel 113 to display contents in a typical fashion and may cause the light source 130 to be turned on. In other operations, the light source 130 may be turned off when the camera 180 is not capturing an image. This may provide a better black level.

In another example, instead of time-multiplexing, the processor 401 operates the camera 180 to capture images while the light source 130 is emitting light for the LC panel 113. The camera filter 185 of the system 100 filters the light from the light source 130 but passes all other light to the camera 180 so the camera 180 can capture images of the scene in front of the display 100.

The display-camera electronics 400 may be included with the system 100, for example, in the same housing, or may be provided in a separate computer system and connected via an interface, such as interface 403, to the system 100. The interface 403 may be a wired or wireless interface. The interface 403 may include a network interface to connect to a network.

The display-camera electronics 400 may include a data storage 402 that is a non-transitory computer readable medium. The data storage 402 may be memory or other volatile and/or non-volatile data storage. The data storage 402 may store data and/or machine readable instructions. The machine readable instructions when executed by the processor perform the operations described above. In an example, the machine readable instructions may be part of an installation package that can be executed by the processor 401 to run the remote collaboration between the system 100 and another similar system.

Figure 5:
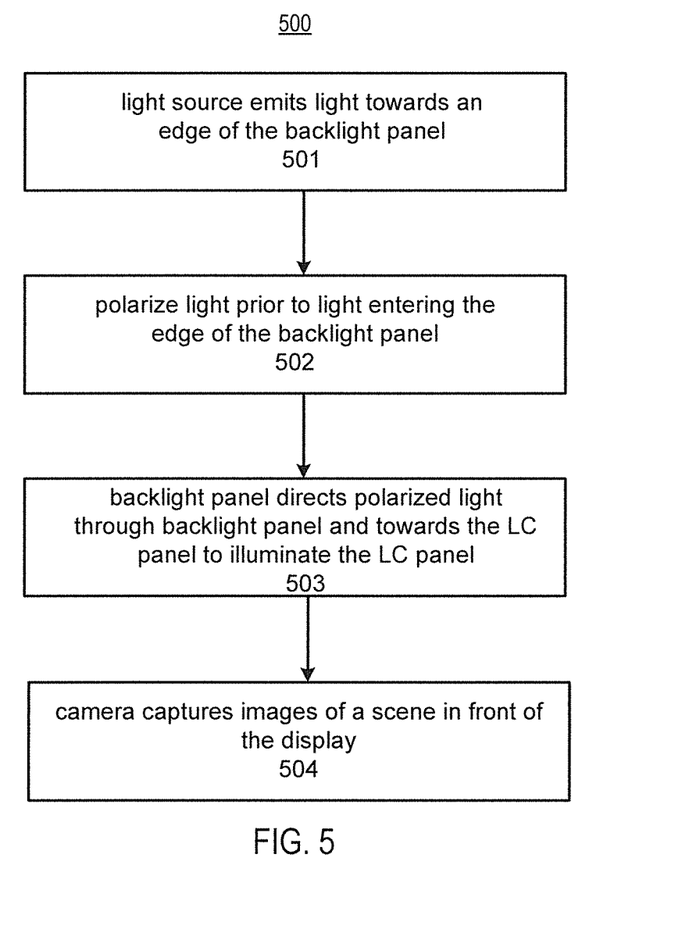
FIG. 5 illustrates an example of a method that may be implemented by a display-camera system.

FIG. 5 illustrates a method 500 according to an example for capturing images through a transparent display. The method 500 is described with respect to the system 100 shown in FIGS. 1-4 by way of example. At 501, the light source 130 emits light towards an edge of the backlight panel 120. At 502, the polarizer 150 polarizes the light prior to the light entering the edge of the backlight panel 120. At 503, the backlight panel 120 directs the polarized light through the backlight panel and towards the LC panel 113 to illuminate the LC panel 113. The LC panel 113 may use the illumination to display content, which may include polarizing the light emitted from the LC panel 113 by the polarizer 151. At 504, the camera 180 captures images of a scene in front of the display 110. In one example, the camera filter 185 is designed to match the narrow band frequencies of the light emitted by the light source 130. While the light source 130 is emitting light, the camera 180 captures an image of the scene in front of the display 110 (e.g., captures an image of the viewer 101). The image is captured from the light not filtered by the camera filter 185. In another example, using the time multiplexing technique, the light source 130 is activated to emit light to display content on the display 110. While the light source 130 is emitting light, the camera 180 does not capture images. The light source 130 is controlled to stop emitting light, and the camera 180 captures an image of the scene in front of the display 110 (e.g., captures an image of the viewer 101) while the light source 130 is not emitting light to illuminate the display 110. The multiplexing is repeated to provide display and image capture as desired. In one example, the switching between the camera 180 and the display 110 may be provided at a high frequency so it may not be noticed or may be minimally noticed by the viewer 101.

Examples are described but various modifications to the described examples may be made without departing from the scope of the claims.

What is claimed is:

1. A display-camera system comprising:
   a transparent display panel having a front surface to display images to a viewer and a back surface;
   a transparent backlight panel having a front surface, a back surface and an edge, wherein the front surface of the transparent backlight panel is adjacent the back surface of the transparent display panel;
   light sources to emit light into the edge of the transparent backlight panel;
   a first polarizer, between the light sources and the edge of the transparent backlight panel, to polarize the light emitted, from the light sources, wherein the transparent backlight panel is to direct the polarized light entering the edge of the transparent backlight panel towards the back surface of the transparent display panel;
   a camera, adjacent the back surface of the transparent backlight panel, to capture an image of a scene through the transparent display panel and the transparent backlight panel; and
   a camera filter between the back surface of the transparent backlight panel and the camera, wherein the camera filter is to filter the light emitted by the light sources and to pass other light to capture the image of the scene.

2. The display-camera system of claim 1, wherein the light sources are narrow band light sources and the camera filter includes a filter that matches wavelengths of the narrow band light sources to block the light emitted by the narrow band light sources.

3. The display-camera system of claim 1, wherein the light sources and the camera are multiplexed to switch the camera on to capture the image of the scene when the light sources are off and do not emit the light, and to switch the camera off to stop capturing images of the scene when the light sources are on and emit the light.

4. The display-camera system of claim 1, comprising:
   a color filter array including a set of filters for each colored subpixel in the transparent display panel, wherein each set of filters only passes wavelengths of the corresponding colored subpixels.

5. The display-camera system of claim 4, wherein each filter for each subpixel comprises a layer with dual notch properties that are able to pass light for the subpixel and block other wavelengths of the light emitted by the light sources.

6. The display-camera system of claim 4, wherein each filter for each subpixel comprises multiple layers, and each layer blocks wavelengths of the light emitted by the light sources that are not for a color of the corresponding subpixel.

7. The display-camera system of claim 4, comprising a second polarizer to polarize light emitted from the front surface of the transparent display panel, and the color filter array is between the front surface of the transparent display panel and the second polarizer.

8. The display-camera system of claim 1, comprising micro-optic structures in the transparent backlight panel to direct the light emitted from the light sources towards the back surface of the transparent display panel.

9. The display-camera system of claim 1, comprising micro-optic structures in the transparent backlight panel to direct the light emitted from the light sources for a colored subpixel towards the colored subpixel in the transparent display panel.

10. The display-camera system of claim 1, wherein the transparent display panel is a liquid crystal display.

11. A display-camera system comprising:
    a liquid crystal display (LCD) panel;
    light sources to illuminate the LCD panel;
    a transparent backlight panel adjacent the LCD panel;
    a first polarizer adjacent an edge of the backlight to polarize light emitted from the light sources, wherein the transparent backlight is to direct the polarized light entering the edge of the backlight towards a back surface of the LCD panel;
    a second polarizer adjacent a front surface of the LCD panel to polarize light emitted from the LCD panel;
    a camera, adjacent a back surface of the transparent backlight panel, to capture an image of a scene through the LCD panel and the transparent backlight panel, wherein to capture the image, the camera is to sense light from the scene, and the light from the scene sensed by the camera does not pass through the first polarizer; and
    micro-optic structures in the transparent backlight panel to direct the light emitted from the light sources towards the back surface of the transparent display panel.

12. The display-camera system of claim 11, comprising:
    a camera filter between the back surface of the transparent backlight panel and the camera, wherein the camera filter is to filter the light emitted by the light sources and to pass other light to capture the image of the scene.

13. The display-camera system of claim 12, wherein the camera captures the image of the scene while content is displayed on the LCD panel.

* * * * *